United States Patent [19]

Wagner

[11] 3,735,359

[45] May 22, 1973

[54] DIGITAL CONFERENCE BRIDGE

[75] Inventor: Leo H. Wagner, Oceanport, N.J.

[73] Assignee: The United States of America as represented by the Secretary of the Army, Washington, D.C.

[22] Filed: July 30, 1971

[21] Appl. No.: 167,740

[52] U.S. Cl. .................................. 340/172.5, 179/37

[51] Int. Cl. ............................ G06f 3/04, H04m 3/56

[58] Field of Search ....................... 340/172.5; 179/37

[56] References Cited

UNITED STATES PATENTS

| | | | |
|---|---|---|---|
| 3,281,793 | 10/1966 | Oeters et al. | 340/172.5 |
| 3,543,242 | 11/1970 | Adams, Jr. et al. | 340/172.5 |
| 3,417,374 | 12/1968 | Pariser | 340/172.5 |
| 3,399,385 | 8/1968 | Gorman et al. | 340/172.5 |
| 3,342,944 | 9/1967 | Barbato et al. | 179/37 |

*Primary Examiner*—Gareth D. Shaw

*Attorney*—Harry M. Saragovitz, Edward J. Kelly, Herbert Berl et al.

[57] ABSTRACT

This invention concerns operating a plurality of spaced digital voice communication equipments of the same type in a conference hookup at a digital conference bridge. All of the communication equipments are known in the art and operate at the same sampling or modulation rate. The novel digital conference bridge has a line buffer store and an input character register per conferee, an electronic scanner switch and logic circuit for selecting an output signal from among the input registers at programmed time intervals and to transfer the selected output signal to all of the conferees through one output character register and one output buffer store.

5 Claims, 4 Drawing Figures

INVENTOR,
LEO H. WAGNER

BY Arthur L. Bowers AGENT
Harry M. Saragovitz
Edward J. Kelly
Herbert Berl ATTORNEYS

INVENTOR,
LEO H. WAGNER

BY Arthur L. Bowers AGENT

Harry M. Saragovitz
Edward J. Kelly
Herbert Berl ATTORNEYS

DIGITAL CONFERENCE BRIDGE

BACKGROUND OF THE INVENTION

In analog conference circuits, input signals from all conferees, after passing through respective analog amplifiers, are summed. The output signal of the analog conference circuit is a composite of all input signals. In digital voice communications, present methods of conferencing include converting the digital signals into analog signals, then combining the analog signals as in the conventional analog conference bridge. The summed analog signals are digitized and transmitted digitally. This method, which includes digital-to-analog and analog-to-digital conversion degrades the information and requires a great deal of circuitry.

SUMMARY OF THE INVENTION

An object of this invention is to provide a digital conference bridge that provides a digital output without the intermediate steps of digital-to-analog, and analog-to-digital conversion.

This invention utilizes well-known types of digital voice communication techniques including delta modulation and pulse code modulation. In both these techniques, the voice waveform is sampled regularly at a constant modulation rate m. In delta modulation, 19.2*k* bits per second or, for better definition, 38.4*k* bits per second is commonly the modulation rate. In PCM 48*k* of 64*k* bits per second is commonly the modulation rate. In the delta modulation technique, a 1 or 0 is transmitted for each sample. The 1 or 0 represents a fixed amplitude delta to be added to or subtracted from the immediately preceding amplitude level at the reconstructed waveform; when the transmitted waveform is not changing amplitude, a succession of alternate 1 and 0 is transmitted whereby the delta amplitude is alternately added and subtracted. In the pulse code modulation technique, 6-bits, or for better definition, 8-bits, are transmitted on each sample for providing precise amplitude information on the sample. A number of communication stations variously located and equipped with the digital communication equipments may be linked to a switchboard as in conventional telephone systems and any two communication stations are patched through the switchboard, as required. In this invention, three or more of the communication stations, up to a predetermined maximum are connected in a conference hookup. A novel digital conference bridge is provided for this purpose. If no switchboard is used to connect the communication stations to the conference bridge, all of the communication stations are permanently connected to the conference bridge. The digital conference bridge includes a line buffer store and an input character register for the maximum number of conferees respectively, and one output character register and one output buffer store for all of the conferees. An electronic scanner switch couples information bits from the input character registers, in succession, to the output character register during each scan. A logic circuit coupled to the output character register operates in the preferred embodiment in such manner that the first conferee in the succession to deliver information bits blocks out all of the succeeding conferees during that scan; information bits from the other conferees during that same scan are cancelled.

BRIEF DESCRIPTION OF THE DRAWINGS

The exact nature of this invention will be readily apparent upon consideration of the following specification in view of the annexed drawings in which.

DETAILED DESCRIPTION OF THE PREFERRED EMBODIMENT

Figure 1:
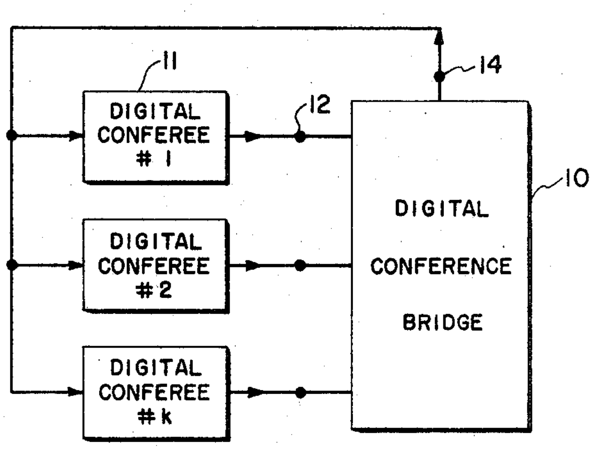
FIG. 1 is a schematic block diagram of a digital conference hookup in accordance with this invention.
Figure 2:
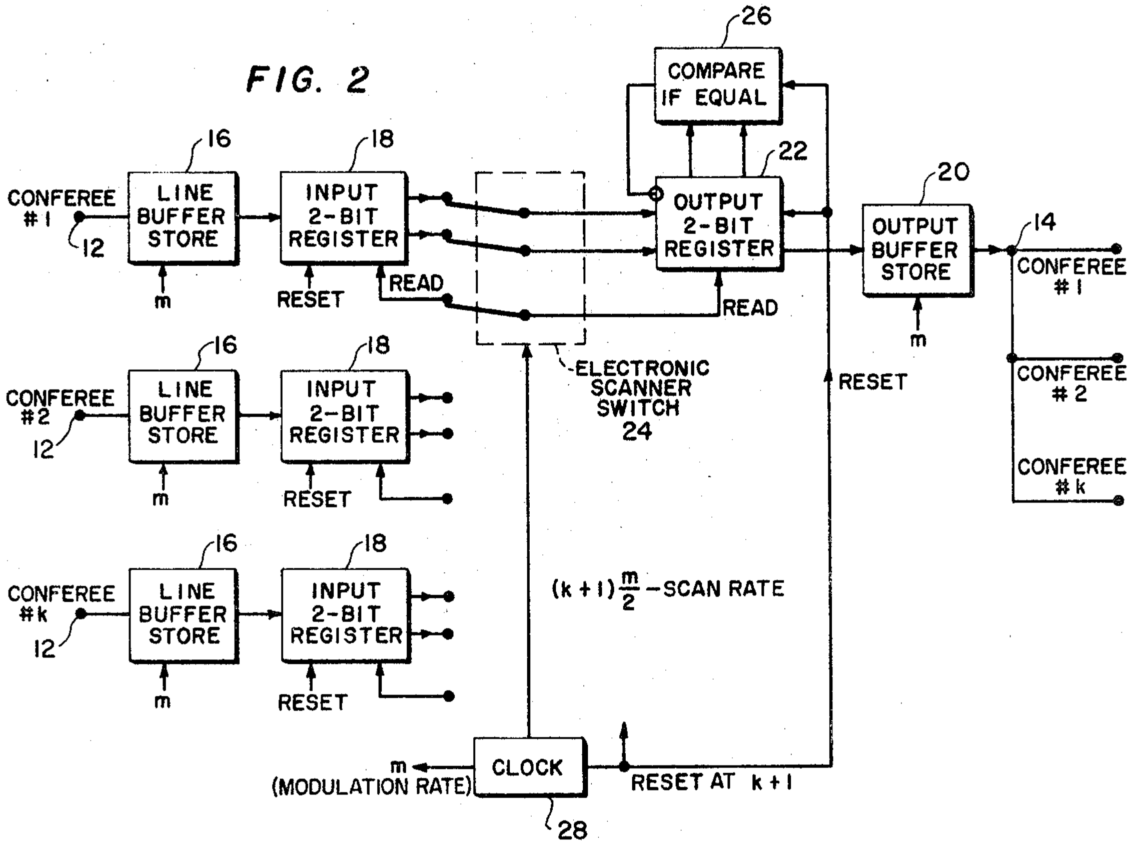
FIG. 2 is a delta modulation digital conference bridge for the embodiment shown in FIG. 1.

The embodiment shown in FIG. 1 includes a digital conference bridge 10 for k digital conferees 11. The conference bridge has *k* input terminals 12 and one output terminal 14 where *k* is equal to the maximum number of communication stations or conferees to be linked in a conference hookup. The transmit line of each conferee is coupled to an input terminal 12 and the receive line of every conferee is connected in common to the output terminal 14. A delta modulation digital conference bridge for the embodiment of FIG. 1 is shown in FIG. 2. A line buffer store 16 is connected to each input terminal 12 and a 2-bit register 18 is connected to the output of each line buffer store. An output buffer store 20 is connected to the output terminal 14, and the output of a 2-bit register 22 is connected to the buffer store 20. During each programmed interval, information bits from one only of the input registers 18 is read by the output register 22.

Each of the registers 18 and 22 has a READ terminal. When a read pulse is coupled into register 18, it empties the stored bits and when a read pulse is coupled into register 22 it reads the bits emptied by the register to which it is coupled. An electronic scanner switch 24, shown as a multiposition switch for illustration only, operates under the control of clock pulses to index from register 18 to register 18 and at each connects the two output terminals of the respective register 18 to the two input terminals of register 22 and also interconnects their READ terminals. Each indexing pulse is also a READ pulse or alternatively is accompanied by a READ pulse. When switch 24 is indexed, it interconnects output register 22 and a succeeding input register 18 and a READ pulse is delivered by the electronic switch to the interconnected registers; the input register is emptied of the 2 bits stored therein and the bits are read by the output register 22. A compare-if-equal logic circuit 26 is coupled to the output 2-bit register 22 and is operable to inhibit the output register 22 from reading after 11 or 00 bits are read by register 22 until a succeeding reset pulse is delivered to the output register 22 and to the compare-if-equal circuit 26.

The conference bridge includes and is controlled by clock 28 which delivers a train of pulses *m* at the modulation rate to every buffer store to shift the succession of bits stored in the respective buffer stores by 1 bit in response to each m pulse, whereby each buffer store is readied for an incoming bit from the respective conferee in response to each *m* pulse. The clock also generates a train of switch indexing and READ pulses. During each *m* period, the clock delivers $(k + 1/2)$ switch indexing and READ pulses; during two successive m periods, the clock delivers an indexing and READ pulse for each of $k$ conferee terminals plus an additional pulse, coincident with an $m$ pulse, for a switch interval between the connection of the last or $k^{th}$ conferee and the connection of the first conferee. The $k+1$ switch interval is the beginning of the scan cycle. All the registers and the compare-if-equal 26 are reset at $k+1$; the input registers 18 are filled from the respective line buffer stores 16 and the output register is emptied into the output buffer store 20. Scan cycle time depends on the modulation rate. For example, in a $20k$ bit per second delta modulation system, one scan cycle of the electronic switch 24 is completed every $100\mu s$ with the transfer of 2 bits of information.

Figure 3:
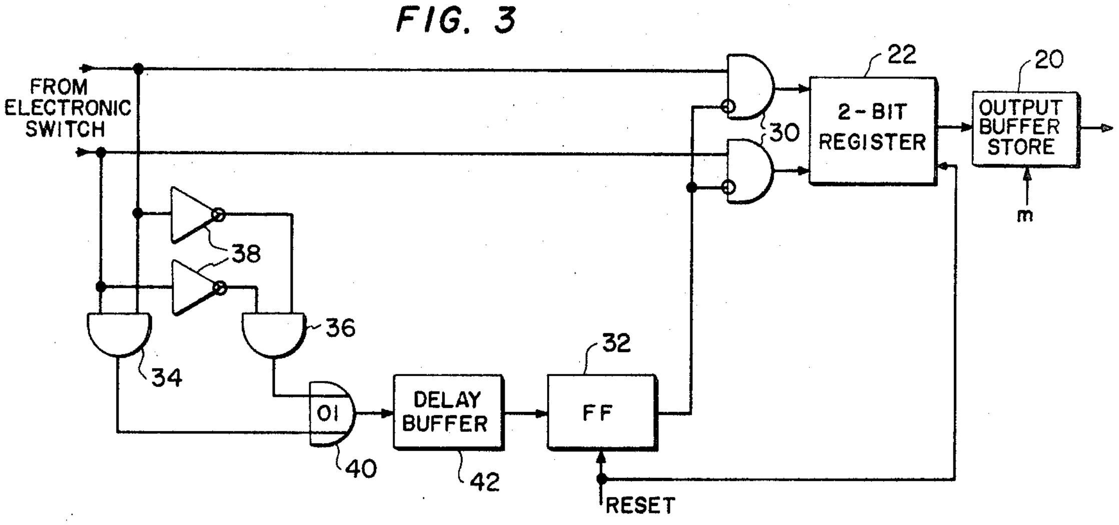
FIG. 3 is a compare-if-equal logic circuit for use in the delta modulation digital conference bridge shown in FIG. 2.

An example of a compare-if-equal circuit 26 is shown in FIG. 3 connected to output register 22. A pair of inhibit gates 30 are connected in series with the bit-input terminals of output register 22. A flip-flop 32 is connected to one of the inputs of both gates 30. In the state of the flip-flop immediately following a reset pulse, the gates 30 transmit all bits delivered by the electronic switch 24; in the other state of the flip-flop, the gates 30 block the information input terminals of the output register 22. AND gate 34 is connected to the bit leads of the electronic switch; AND gate 36 is connected to the bit leads of the electronic switch through inverters 38. An OR gate 40 is connected to the outputs of the AND gates 34 and 36. Following reset at k+1, the electronic switch begins scanning at conferee number 1. A 01 or 10 in any register 18 has no effect. At the first register 18 with 11 encountered by the electronic switch 24, flip-flop 32 is triggered through AND gate 34 and OR gate 40. A delay buffer 42 between the OR gate 40 and flip-flop 32 delays inhibiting the gates 30, 30 so as to permit the information bits 11 to be read by the register 22. The electronic switch continues to index toward the $k$ conferee but no additional information is read into register 22 during that scan because gates 30, 30 are closed for the remainder of the scan. When the scan is completed, a reset pulse from the clock at $k+1$ empties 11 from the register 22 into the output buffer store 20 and the input registers 18 are refilled from the input buffers. If, during the scan, 00 is the first information encountered, the flip-flop 32 is triggered but through the inverters 38, AND gate 36, OR gate 40 and delay buffer 42. If neither 00 nor 11 is encountered during a scan, the output of the register 22 is 01 or 10 depending on the information bits read from the register 18 of the $k^{th}$ conferee.

Most of the time, where there is information, there is information on one only of the conference lines and the one line with information reaches steady state operation.

During a conference hookup, when a conferee is not speaking, alternate 1 and 0 bits are transmitted to the respective input terminal 12. Noise effects are minimized by maintaining a high signal-to-noise ratio and sufficient threshold to remove substantially all the noise. The conference leader has the position of conferee No. 1 in the circuit and can cut in and capture the conference at will. Simple conference courtesy and discipline will insure orderliness. All conferees including the speaker hear the information transmitted through the conference bridge. Unless the conferees are great distances apart or the buffers store many bits, the time lag between any speakers input and the side tone to his own receiver is insignificant and not disturbing. For the less likely condition of use of the described embodiment where the time lag would be troublesome to the speaker, each receiver may be provided with a switch for use in selecting between two levels of listening volume. In a conference hookup with less than the maximum number of conferees, provision is made either at the switchboard or unmanned communication stations for the unused conferee terminals to receive successive 0 and 1 bits at the modulation rate.

An alternate method of operation for the system described is to check more than two bits from each conferee during each scan to obtain a more reliable indication that no information is present on an input line. For example, ten consecutive 01 or 10 indications would be observed prior to indexing the electronic switch to the next conferee for a more accurate indication that there is no information on an input line. The scan cycle is adjusted accordingly. A variation of this alternate method may include timed transmission of the information from an input line. For example, if 10 consecutive 01 or 10 indications are not received, electronic switch scan is temporarily inhibited so that the line is connected to the output register for a relatively extended interval such as 20 milliseconds and at the end of that interval, another determination is made. If the next 10 indications are 10 or 01, the electronic switch is indexed but if not, the same line continues to be connected for another 20 millisecond interval. Another variation includes the use of registers for storing more than 2 bits and for the system to make the determination to scan or stop scan at a conferee position on the basis of the multibit sample.

Another alternate method of operating the described system is broadcast operation, namely setting the electronic switch at conferee number 1, the conference originator's line. For a mix of broadcast operation and conference the electronic switch is controlled to scan a limited number of conferees, e.g. the first three conferees only.

Figure 4:
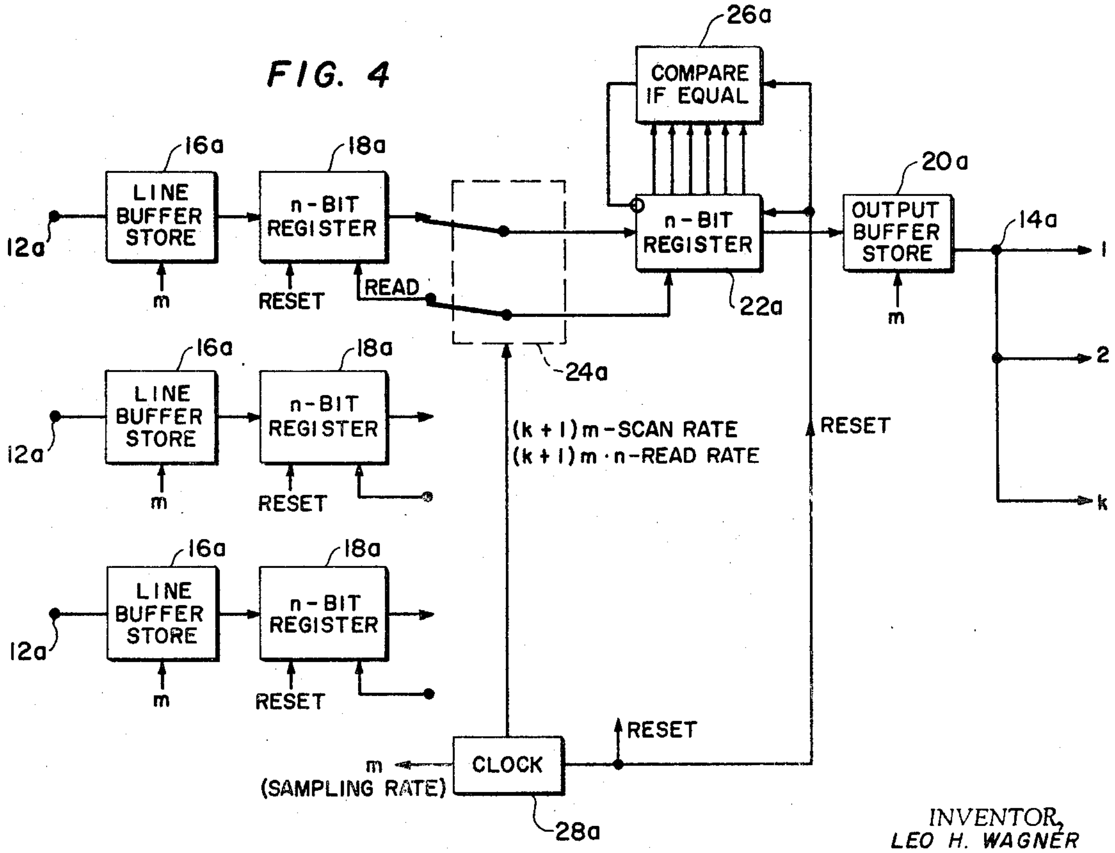
FIG. 4 shows a pulse code modulation (PCM) digital conference bridge in accordance with this invention.

The embodiment shown in FIG. 4 is a pulse code modulation (PCM) system analogous to the delta modulation system shown in FIG. 2 for use in the combination shown in FIG. 1. Similarly numbered elements perform similar functions in the two embodiments. The registers **18*a* and 22*a* store a number of bits n corresponding to the number of bits in each PCM character. The bits are emptied serially by register 18*a* and read serially by register 22*a*. The line buffer stores and the output buffer store is shifted $n$ bits at each $m$ pulse. A compare-if-equal 26*a* is selected to perform the function analogous to its counterpart in FIG. 2; the determination that a line has information or not is made on the basis of the numerical value of the characters. The scan rate of the electronic switch is $8k$ cps. The read rate is equal to the scan rate multiplied by the number of bits ($n$) per character. For each $m$ pulse there is a reset pulse. Operation is similar to that of the delta modulation system of FIG. 2.**

An alternate method of operating the PCM system described is to operate the electronic switch to dwell on an active conferee for an arbitrary time interval such as 20 or 100 milliseconds or for a selected number of samples, e.g. 2,048 at $48k$ or $64k$ bits per second. The scan is stopped by inhibiting and then resuming scan pulses to the electronic switch. The scan may be resumed at the succeeding conferee or at conferee number 1. The register capacity may be increased to hold several samples.

While the invention has been described in connection with a preferred embodiment, modifications thereof will be possible without departing from the inventive concepts disclosed herein, hence the invention should be limited only by the scope of the appended claims.

What is claimed is:

1. A digital conference bridge comprising:

*k* input terminals and one output terminal for combining in a conference hookup k delta modulation voice communication equipments that are operable at the same sampling rate, clock means having first, second, and third terminals, and delivering at the first terminal periodic pulses m at the sampling rate of the voice communication equipments, and delivering at the second terminal during two successive *m* pulse periods *k*+1 pulses, one of said *k*+1 pulses being coincident with an *m* pulse, and delivering at the third terminal one reset pulse for every two *m* pulses coincident with an *m* pulse and said one of said *k*+1 pulses,

*k* line buffer stores, each having an input terminal for connection to the output terminal of one conferee equipment and having one output terminal and a shift terminal connected to the first terminal of the clock means whereby the succession of bits stored in the line buffer store is shifted by 1 bit in response to each *m* pulse whereby each line buffer store is readied for one incoming bit in response to each *m* pulse,

*k* input 2-bit registers each having one input terminal connected to the output terminal of a respective line buffer store and having two output terminals for delivering two bits at the same time and having a reset terminal connected to the third terminal of the clock and also having a read terminal, an output 2-bit register and compare-if-equal means having two input terminals and one output terminal and a read terminal and a reset terminal, the latter being connected to the third terminal of the clock means, and being operable following a reset pulse and subsequent 11 bits or 00 bits delivered to the input terminals to inhibit the input terminals of said last-recited means until the next reset pulse, an output buffer store having one input terminal connected to the output terminal of the output 2-bit register and having one output terminal for connection to the receive terminals of the conferee equipments and a third terminal connected to the first terminal of the clock means for shifting the succession of bits stored therein by 1 bit in response to each *m* pulse, and an electronic switch connected to the second terminal of said clock means and indexing and delivering a READ pulse in response to each pulse from the clock means, said switch interconnecting the input terminals of the output two-bit register and the output terminals of one of the succession of input two-bit registers and delivering the READ pulses to the switch-coupled input and output registers whereby the input 2-bit register empties its bits and the output 2-bit register, when not inhibited by the compare-if-equal, reads the bits emptied by the input 2-bit register.

2. A digital conference bridge for combining in a conference hookup up to k delta-modulation voice communication equipments, inclusive, that are operable at a sampling rate *m*, said digital conference bridge comprising:

*k* input terminals for coupling to transmit lines of the conferee equipments, a line buffer store, for storing a predetermined plurality of bits, connected in series with each input terminal, each of said line buffer stores having a shift pulse input operable in response to each shift pulse to shift the succession of bits stored therein by 1 bit and thereby to accept 1 bit from the input terminal, an input 2-bit register connected in series with each line buffer store and having a reset pulse input and a read pulse input, each of said input registers being operable in response to a reset pulse to empty 2 bits from the respective line buffer store and to store those two bits, and also being operable to empty the 2 bits stored therein in response to a read pulse, one output 2-bit register having a read pulse input and a reset pulse input and operable when coupled to one of the input 2-bit registers and in response to a read pulse to the coupled registers to store the 2-bits emptied by the input register to which it is coupled, and also being operable in response to a reset pulse to be emptied of the 2 bits stored therein, an output buffer store coupled to the output register for accepting bits emptied by the output register and having a shift pulse input and operable in response to each shift pulse to shift the bits stored therein by 1 bit, said output buffer store also having an output terminal for connecting to the receive line of all the conferee equipments coupled to the input terminals, an electronic switch operable to couple the output register to the input registers successively in response to indexing pulses, for delivering bits emptied by the input register coupled thereby to said output register, a compare-if-equal means coupled to said output register and having a reset pulse input and operable to inhibit acceptance of any bits by said output register following delivery of a pair of bits thereto of the same kind, until reset, clock means providing a train of shift pulses at the sampling rate *m* to the shift pulse inputs of all the buffer stores, and further delivering to the electronic switch *k*+1 indexing pulses and *k*+1 read pulses to the registers during two successive *m* periods, one of the *k*+1 pulses being coincident with an *m* pulse during an interval between couplings of input registers to the output register, and further delivering a reset pulse to the registers and the compare-if-equal means in coincidence with the indexing pulse that occurs between couplings of said input registers to the output register.

3. A conference hookup comprising in combination, a plurality of digital voice communication equipments of the same type and that operate at the same modulation rate, clock means, circuit means having input terminals connected to the transmit lines of each of the equipments respectively and having one output terminal connected to the receive lines of all the equipments and being connected to and controlled by said clock means to transfer to the output terminal the input transmitted to no more than one of the input terminals during each of successive uniform time intervals, and for each of the successive uniform time intervals canceling every input not transferred to the output terminal.

4. A digital conference bridge for combining in a conference hookup a plurality of digital voice communication equipments of the same type and that operate at the same modulation rate comprising:

clock means, circuit means having input terminals for connection to the transmit line of each of the equipments respectively and having one output terminal for connection to the receive lines of all the equipments and being connected to and controlled by said clock means to transfer to the output terminal the input transmitted to no more than one of the input terminals during each of successive uniform time intervals and for each of the successive uniform time intervals, canceling every input not transferred to the output terminal.

5. A digital conference bridge as defined in claim 4 wherein said circuit means includes an input delay means controlled by said clock means coupled to each input terminal respectively, and a single delay means controlled by said clock means coupled to the output terminal, and means controlled by said clock means operable to transmit information from one only of the input delay means to the output delay means during each of the successive uniform time intervals.

* * * * *